(12) United States Patent
Yamano et al.

(10) Patent No.: US 8,810,720 B2
(45) Date of Patent: Aug. 19, 2014

(54) IMAGING DEVICE SUPPORT-ATTACHING PART COVER

(75) Inventors: Yoshikazu Yamano, Osaka (JP); Yasuhiro Miyamoto, Osaka (JP); Makoto Iyoda, Osaka (JP); Shinya Ogasawara, Hyogo (JP); Tomonori Mizutani, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 218 days.

(21) Appl. No.: 13/394,813

(22) PCT Filed: Jun. 29, 2011

(86) PCT No.: PCT/JP2011/003726
§ 371 (c)(1),
(2), (4) Date: Mar. 8, 2012

(87) PCT Pub. No.: WO2012/077251
PCT Pub. Date: Jun. 14, 2012

(65) Prior Publication Data
US 2012/0274840 A1    Nov. 1, 2012

(30) Foreign Application Priority Data

Dec. 6, 2010   (JP) ................................. 2010-271857

(51) Int. Cl.
*H04N 5/225*   (2006.01)
*G03B 17/00*   (2006.01)

(52) U.S. Cl.
USPC ........................... 348/373; 348/376; 396/419

(58) Field of Classification Search
USPC .................. 348/373–376, 81–85; 396/25–29, 396/419–428
See application file for complete search history.

(56) References Cited

U.S. PATENT DOCUMENTS 4,752,792 A  *   6/1988   Keith ............................ 396/425
6,151,455 A  *  11/2000   Mikami et al. ................ 396/205

FOREIGN PATENT DOCUMENTS

| JP | 2007-127836 A | 5/2007 |
| JP | 2007-281621 A | 10/2007 |
| JP | 2008-145534 A | 6/2008 |

* cited by examiner

*Primary Examiner* — Sinh Tran
*Assistant Examiner* — Christopher K Peterson
(74) *Attorney, Agent, or Firm* — James W. Judge

(57) ABSTRACT

Provided is an imaging device that does not let a user experience a sense of discomfort by touching a support attaching part. The imaging device includes: a support attaching part that is disposed on a support attaching surface and includes a screw hole; and a support attaching part cover that moves between a first position covering the support attaching part and a second position uncovering the support attaching part without generating convexness with regard to the support attaching surface. When a support is attached to the support attaching part, the support attaching part cover moves from the first position to the second position; and when the support is removed from the support attaching part, the support attaching part cover moves from the second position to the first position.

5 Claims, 9 Drawing Sheets

F I G. 7
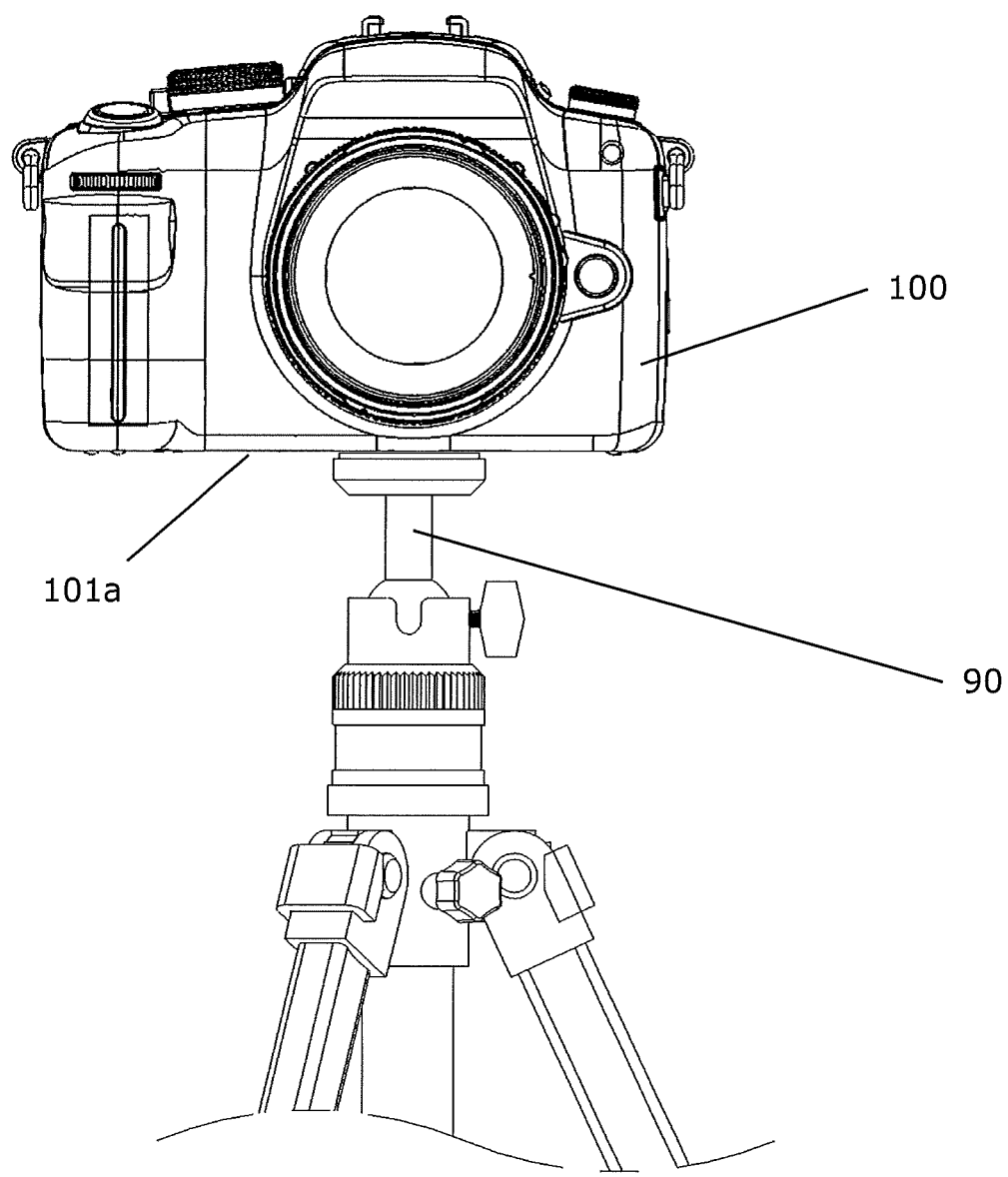

ated by the electronic components to the support attaching part. Thus, a user may experience a sense of discomfort when the user touches the support attaching part and feels a difference in temperature between the temperature of the periphery and the temperature of the support attaching part. On the other hand, in order to stably support an imaging device with a support, it is preferable to arrange the support close to the center of gravity of the camera body. Thus, it is preferable to arrange the support attaching part at a position suitable for attaching the support.

IMAGING DEVICE SUPPORT-ATTACHING PART COVER

TECHNICAL FIELD

The present invention relates to imaging devices to which supports can be attached.

BACKGROUND ART

As imaging devices, for example, interchangeable lens type digital cameras are known (for example, cf., Patent Literature 1). A camera disclosed in Patent Literature 1 includes a lens unit and a camera body. The camera body includes an imaging element such as a CCD (Charge Coupled Device) image sensor, and a mirror box apparatus interposed between the lens unit and the imaging element. The mirror box apparatus guides light that has passed through the lens unit to either the CCD image sensor or a prism. Light guided to the prism is then guided by the prism to a finder.

In some cases, such imaging devices are provided with a support attaching part for attaching thereto a support including a tripod, a monopod, and the like. For example, a known interchangeable lens type digital camera includes a support attaching part on a bottom surface thereof. The attitude of the digital camera can be stabilized for taking an image, by attaching to the support attaching part a tripod that supports the digital camera.

CITATION LIST

Patent Literature

[PTL 1] Japanese Laid-Open Patent Publication No. 2007-127836

SUMMARY OF THE INVENTION

Problems to be Solved by the Invention

Conventionally, there has been a demand to reduce the sizes of imaging devices; and, for example, with interchangeable lens type digital cameras, there has been a demand to reduce the size of a camera body. However, components would be densely arranged when the size of the camera body is reduced, and thereby, the distances between a support attaching part and electronic components that generate heat such as an imaging element, a board having installed thereon a camera controller, and the like, become smaller when compared to those in a conventional camera body.

Furthermore, since power consumptions of the imaging element and the camera controller become large associated with the pursuit of obtaining high definition images, the amount of heat generated by these electronic components increases. As a result, there is a possibility of an increase in temperature for the support attaching part due to having a high heat density in the periphery of the electronic components and due to transferring of heat gener- Therefore, an objective of the present invention object to solve the conventional problem, and to provide an imaging device that has a support attaching part arranged at a position suitable for attaching a support and does not let a user experience a sense of discomfort by touching the support attaching part.

Solution to the Problems

The present invention relates to an imaging device to which a support is attachable. In order to achieve the above described objective, the imaging device of the present invention includes a support attaching part allowing a support to be attached thereto, and a support attaching part cover. The support attaching part is provided on a support attaching surface of the imaging device, and has a screw hole. The support attaching part cover moves between a first position covering the support attaching part and a second position uncovering the support attaching part without generating convexness with regard to the support attaching surface.

When the support is attached to the support attaching part, the support attaching part cover moves from the first position to the second position; and when the support is removed from the support attaching part, the support attaching part cover moves from the second position to the first position.

The support attaching part has an exposed surface formed in a periphery of an inlet of the screw hole, and when the support is attached to the support attaching part, the exposed surface and the support make contact with each other. The support attaching surface is provided on an exterior bottom-surface part of the imaging device. The support attaching part cover moves between the first position and the second position by a cam groove pin disposed on the support attaching part cover and a cam groove provided on the support attaching surface.

Advantageous Effects of the Invention

As described above, with the imaging device according to the present invention, a user cannot touch the support attaching part when a support is not attached to the support attaching part since the support attaching part is covered by the support attaching part cover. Therefore, the support attaching part is arranged at a position suitable for attaching the support, and the user will not experience a sense of discomfort by touching the support attaching part. Furthermore, when a support is attached to the support attaching part, the support attaching part cover moves to a position that does not generate convexness with regard to the support attaching surface. As a result, a large area can be ensured on the support attaching surface and thereby the support can be stably attached thereto.

BRIEF DESCRIPTION OF THE DRAWINGS

FIG. 7 shows a state in which the camera body 100 is mounted on a support 90.

DESCRIPTION OF EMBODIMENTS

Best Mode for Carrying Out the Invention

<1-1: General Outline of Digital Camera>

Figure 1:
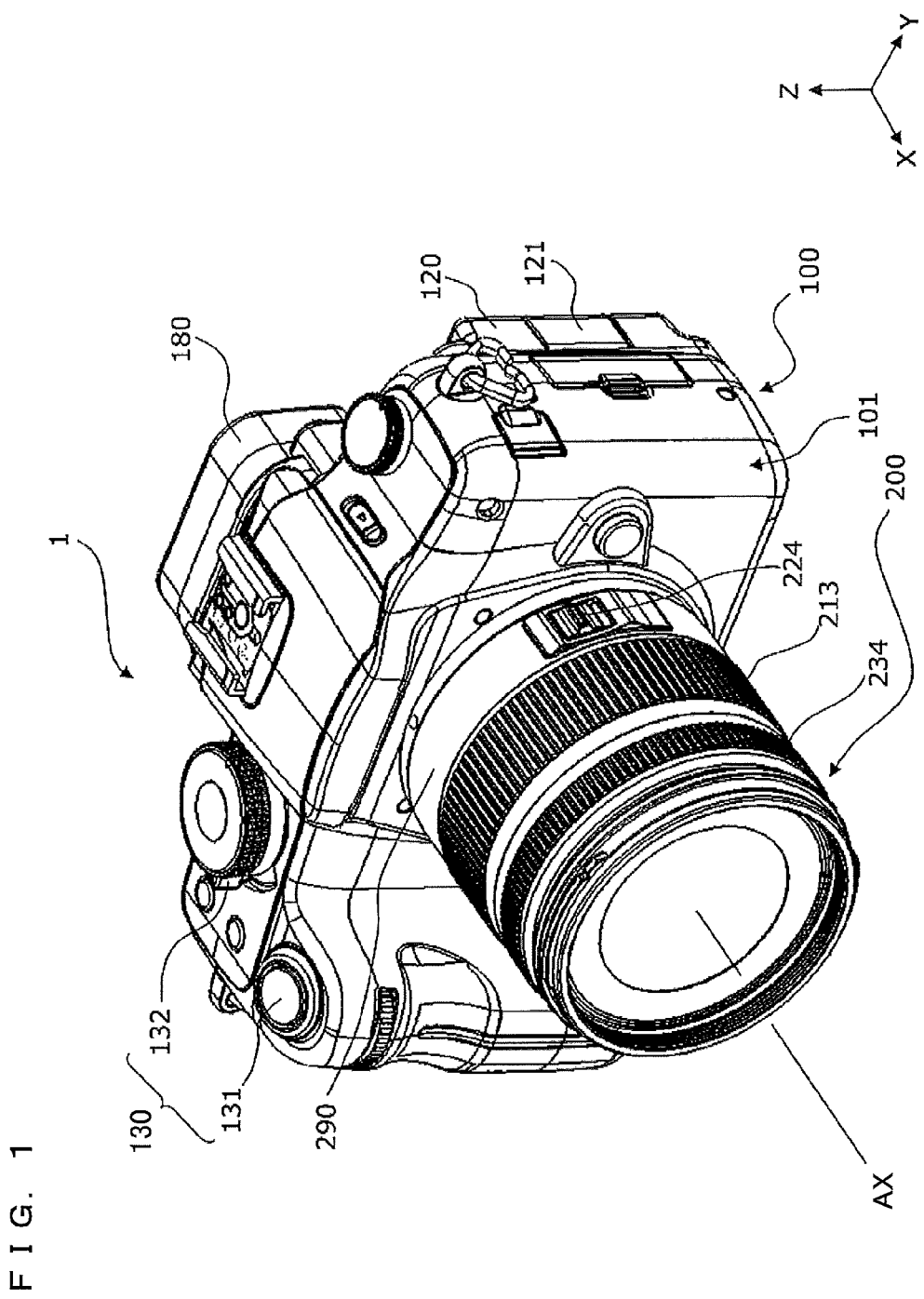
FIG. 1 is a perspective diagram of a digital camera 1.
Figure 2:
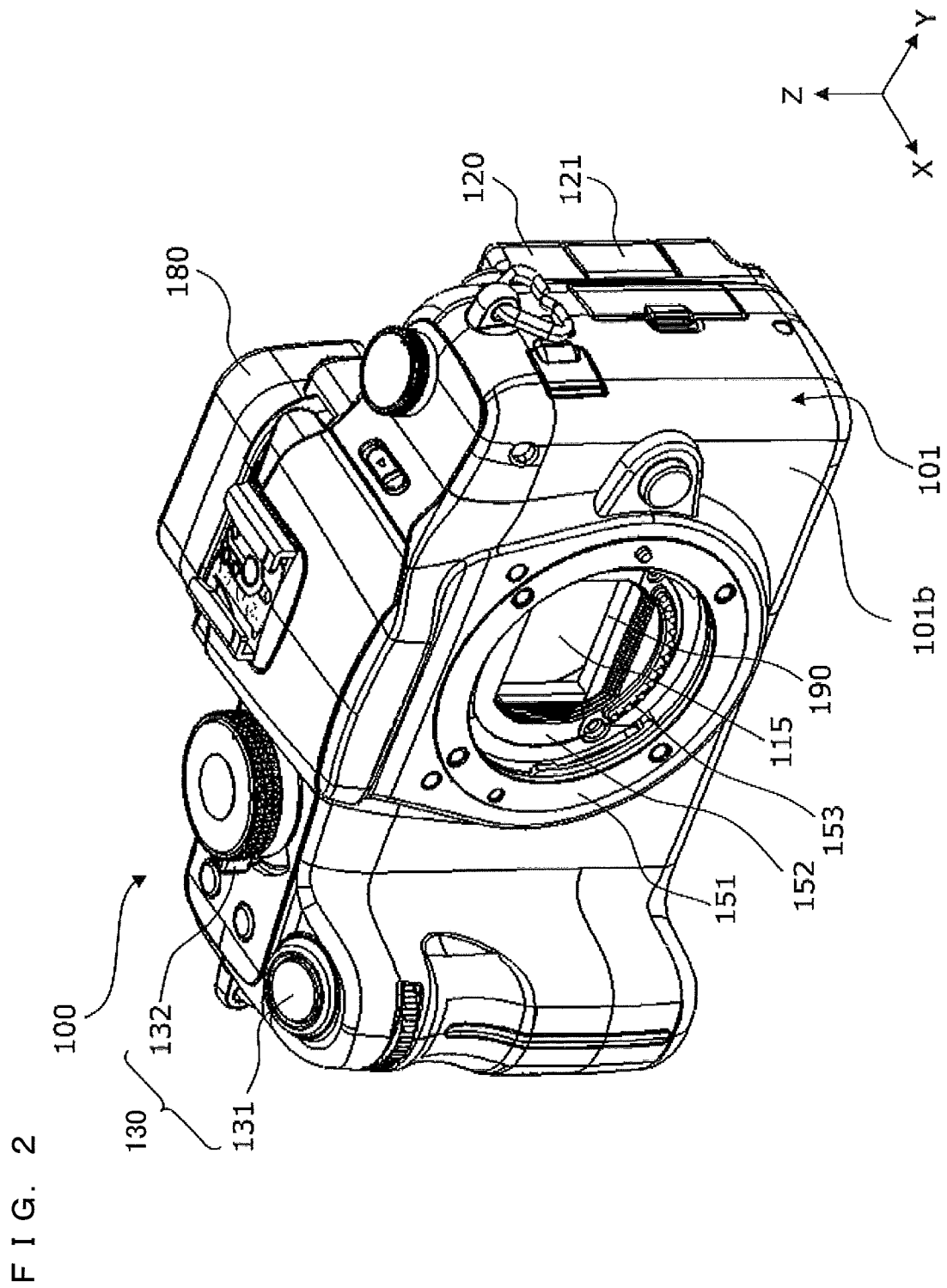
FIG. 2 is a perspective diagram of a camera body 100.
Figure 3:
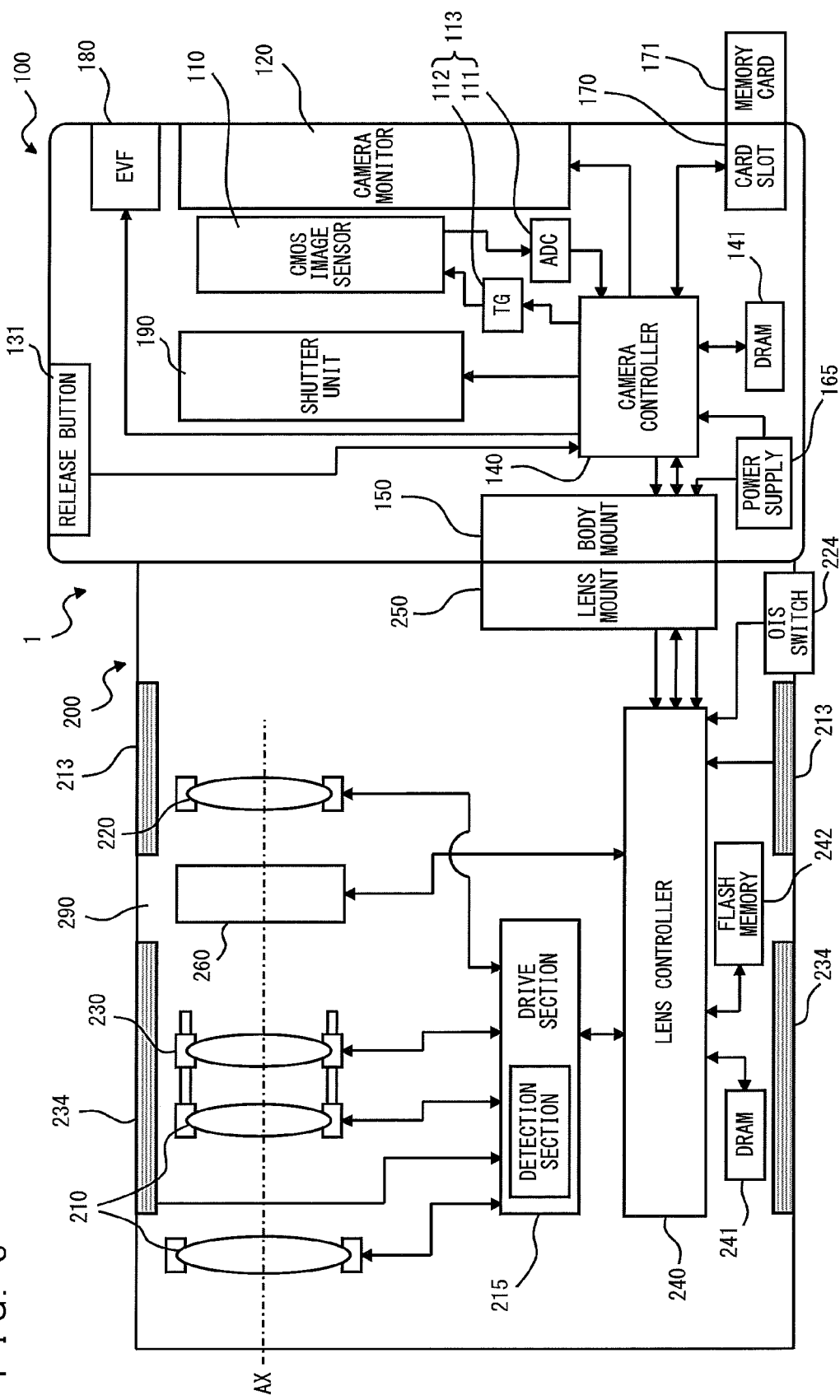
FIG. 3 is a block diagram of the digital camera 1.

FIG. 1 is a perspective diagram of a digital camera 1 (one example of an imaging device) including a camera body 100 according to one embodiment of the present invention. FIG. 2 is a perspective diagram of the camera body 100. FIG. 3 is a functional block diagram of the digital camera 1.

Here, an imaging device refers not only to an imaging device capable of taking an image by itself but also refers to a concept including a camera body. For example, the imaging device includes a camera body of an interchangeable lens type camera to which a lens unit is mountable. Furthermore, a support is a fixing instrument that is attached to the imaging device in order to stabilize the attitude of the imaging device for taking an image. Conceivable supports include, for example, tripods and monopods.

The digital camera 1 is an interchangeable lens type digital camera for acquiring an image of a photographic subject, and includes the camera body 100, and a lens unit 200 mountable to the camera body 100. Unlike a single-lens reflex camera, the camera body 100 does not include a mirror box apparatus, and thereby has a small flange focus when compared to a conventional single-lens reflex camera. Furthermore, reduction in size of the camera body 100 is enabled by reducing the flange focus. In addition, reducing the flange focus allows a high degree of freedom in designing an optical system, and thereby reduction in size of the lens unit 200 is enabled. In the following, details of various parts will be described.

For convenience of description, a photographic-subject side of the digital camera 1 is referred to as the front, and an imaging surface side is referred to as the rear or back; and, in an normal attitude (hereinafter, also referred to as a landscape-photographing attitude) of the digital camera 1, the perpendicular top side is referred to as up or top side, and the perpendicular bottom side is referred to as down or bottom side. Here, when a direction parallel to a long side of a horizontally long rectangular image matches the horizontal direction for a photographic subject in the image, and when a direction parallel to a short side of the image matches the perpendicular direction for the photographic subject in the image; the landscape-photographing attitude refers to an attitude where a direction in which a release button 131 (FIG. 1) is pushed when taking an image basically matches the perpendicular downward direction.

In addition, in the landscape-photographing attitude of the digital camera 1, a right side when viewing the digital camera 1 from the opposite side of the photographic subject is referred to as right or right side. Similarly, in the landscape-photographing attitude of the digital camera 1, a left side when viewing the digital camera 1 from the opposite side of the photographic subject is referred to as left or left side. Furthermore, the perpendicular direction in the landscape-photographing attitude of the digital camera 1 is referred to as an up-down direction or vertical direction. Similarly, the right-left direction in the landscape-photographing attitude of the digital camera 1 is referred to as right-left direction or horizontal direction. Furthermore, a direction perpendicular to both the up-down direction and right-left direction matches the front-rear direction; and a direction facing the photographic subject is referred to as front direction, and a direction opposite to the front direction is referred to as rear direction.

In the following, three-dimensional coordinate axes are set as shown in FIG. 1. In FIG. 1, the X-axis direction matches the front-rear direction, the Y-axis direction matches the right-left direction, and the Z-axis direction matches the up-down direction. Furthermore, coordinate axes described in the drawings other than FIG. 1 are based on the three-dimensional coordinate axis defined in FIG. 1.

<1-2: Configuration of Camera Body>

Figure 4:
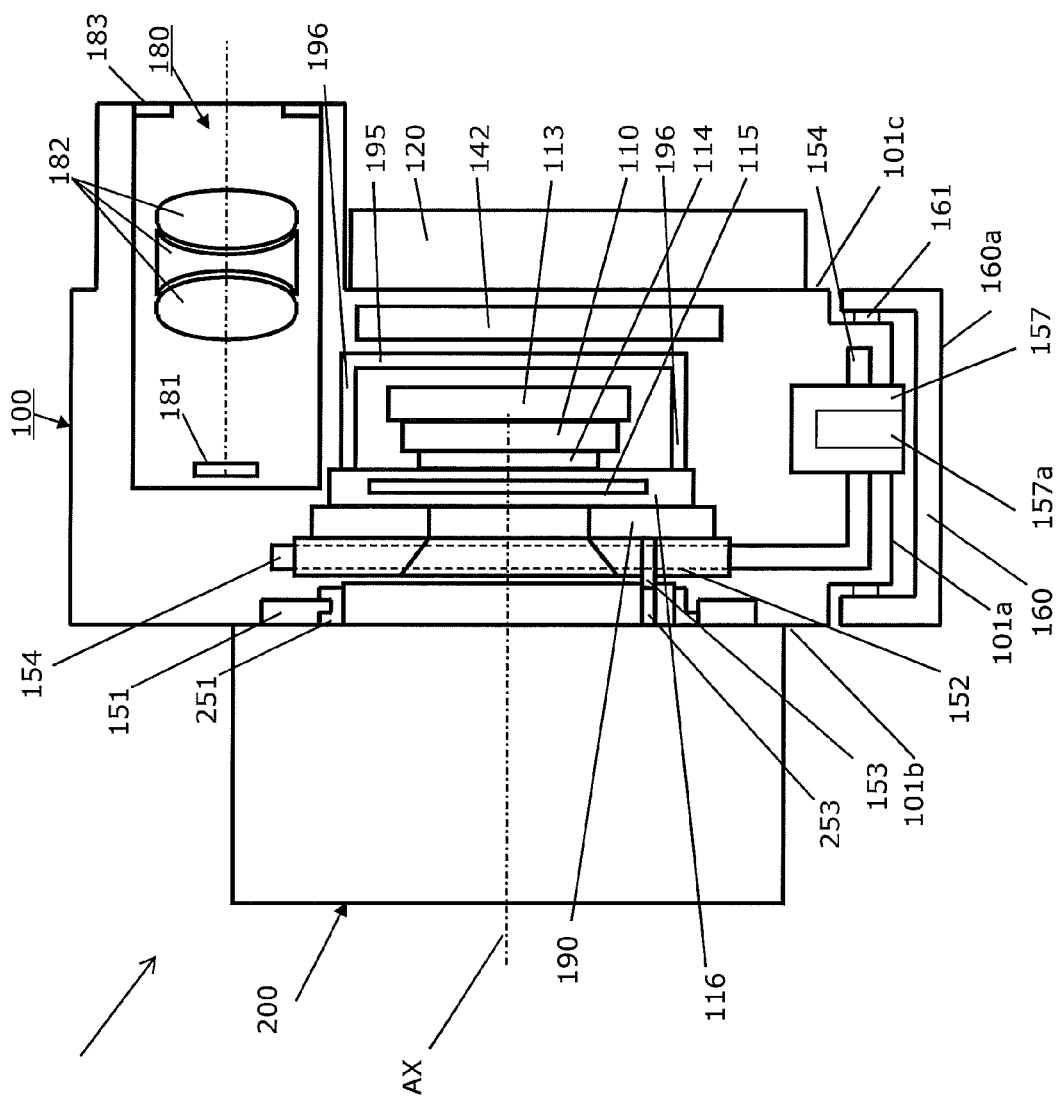
FIG. 4 is an outline cross sectional view of the digital camera 1.
Figure 5:
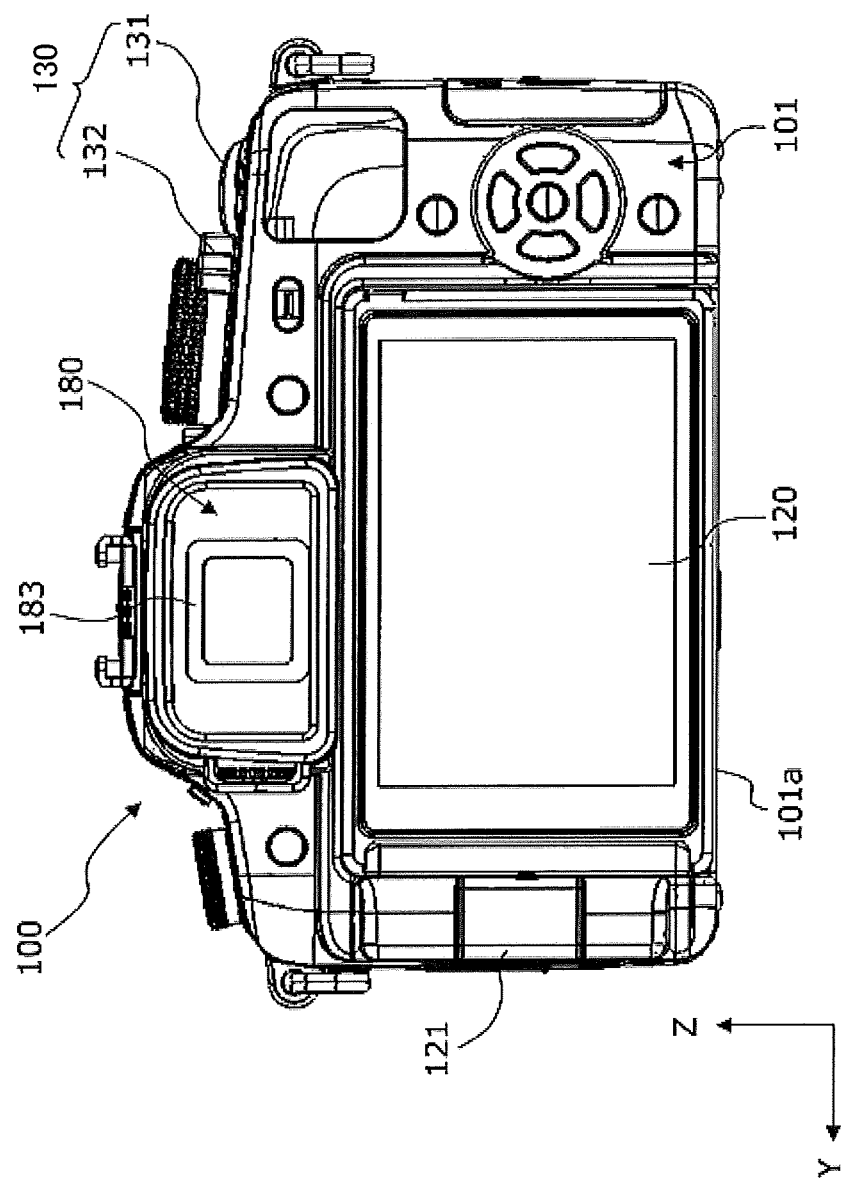
FIG. 5 is a rear view of the camera body 100.

FIG. 4 is an outline cross sectional view of the digital camera 1. FIG. 5 is a rear view of the camera body 100. The camera body 100 (one example of an imaging device) mainly includes a CMOS (Complementary Metal Oxide Semiconductor) image sensor 110, a CMOS circuit board 113, a camera monitor 120, an operation section 130, a main circuit board 142 including a camera controller 140, a body mount 150, a power supply 165, a card slot 170, an electronic view finder (hereinafter, also referred to as an EVF) 180, a shutter unit 190, an optical low pass filter 114, a vibration plate 115, a mainframe 154, a support attaching part 157, a heat dissipation member, and an exterior part 101.

<<Exterior Path>>

The exterior part 101 is a member that forms an external surface of the camera body 100, and includes an exterior bottom-surface part 101a, an exterior front-surface part 101b, and an exterior rear-surface part 101c. In the landscape-photographing attitude, the exterior bottom-surface part 101a is disposed on the bottom side of the CMOS image sensor 110, the exterior front-surface part 101b is disposed on the photographic-subject side, and the exterior rear-surface part 101c is disposed on the photographer side.

Arranged in the camera body 100, in order from the front, are the body mount 150, the shutter unit 190, the vibration plate 115, the optical low pass filter 114, the CMOS image sensor 110, the CMOS circuit board 113, a heat dissipation plate 195, the main circuit board 142, and the camera monitor 120. Furthermore, one part of the mainframe 154 is arranged at a position so as to overlap a direction (hereinafter, also referred to as an optical axis direction) parallel to an optical axis AX and the body mount 150.

<<CMOS Image Sensor>>

The CMOS image sensor 110 converts, into image data, an optical image (hereinafter, also referred to as a photographic subject image) of the photographic subject obtained through the lens unit 200. The generated image data is digitized by an AD converter 111 of the CMOS circuit board 113. By the camera controller 140, various image processing operations are conducted on the image data that have been digitized by the AD converter 111. The various image processing operations referred to here include, for example, a gamma correction process, a white balance adjustment process, a flaw correction process, a YC conversion process, an electronic zoom process, a JPEG compression process, and the like. The functions of the CMOS circuit board 113 may be included in the CMOS image sensor 110 or in the main circuit board 142.

The CMOS image sensor 110 is operated based on a timing signal generated by a timing generator 112 of the CMOS circuit board 113. The CMOS image sensor 110 acquires still image data and video data through a control by the CMOS circuit board 113. The acquired video data is also used for displaying a through-the-lens image. It should be noted that the still image data and the video data are examples of the image data. Here, a through-the-lens image is an image whose data, among the video data, is not stored in a memory card 171. The through-the-lens image is mainly a video image, and is displayed on the camera monitor 120 and/or the electronic view finder 180 to determine the composition of a video image or a still image.

The CMOS image sensor 110 can acquire a low resolution video image that is used as the through-the-lens image, and a high resolution video image that is used for the purpose of being stored. A conceivable high resolution video image includes, for example, an HD size (high-definition size: 1920×1080 pixels) video image. It should be noted that the CMOS image sensor 110 is one example of an imaging element that converts an optical image of the photographic subject into an electrical image signal. As described here, an imaging element is an electronic component that generates an electrical signal representing an image, and is a concept including, other than the CMOS image sensor 110, photoelectric conversion elements such as CCD image sensors and the like.

The CMOS circuit board 113 is a circuit board for controlling the CMOS image sensor 110. In addition, the CMOS circuit board 113 is a circuit board that conducts predetermined process operations on the image data outputted from the CMOS image sensor 110. The CMOS circuit board 113 includes the timing generator 112 and the AD converter 111. The CMOS circuit board 113 is one example of an image element circuit board that drives and controls the imaging element, and conducts predetermined process operations such as analog-to-digital conversion and the like on the image data outputted from the imaging element.

<<Camera Monitor>>

The camera monitor 120 is, for example, a liquid crystal display; and displays images and the like represented by display image data. The display image data is generated by the camera controller 140. The display image data is data for displaying, as images, for example, the image data obtained through image processing, photographing conditions for the digital camera 1, operation menus, and the like. The camera monitor 120 can selectively display a video image and a still image.

The camera monitor 120 is disposed on the camera body 100. In the present embodiment, although the camera monitor 120 is disposed on the rear surface of the camera body 100, the camera monitor 120 may be disposed anywhere on the camera body 100. An angle of a display surface of the camera monitor 120 can be changed with regard to the camera body 100. Specifically, as shown in FIG. 5, the camera body 100 includes a hinge 121 that rotatably connects the camera monitor 120 to the exterior part 101. The hinge 121 is disposed on the left end of the exterior part 101. More specifically, the hinge 121 includes a first hinge and a second hinge. The camera monitor 120 is rotatable in the right-left direction with regard to the exterior part 101 by using the first hinge as a center, and is rotatable in the up-down direction with regard to the exterior part 101 by using the second hinge as a center.

It should be noted that the camera monitor 120 is one example of a display section disposed on the camera body 100. Other than that described above, an organic EL, an inorganic EL, a plasma display panel, and the like capable of displaying images can be used as the display section. Furthermore, the display section may be disposed at a location other the rear surface of the camera body 100, such as a side surface, an upper surface, or the like of the camera body 100.

<<Electronic View Finder>>

The electronic view finder (EVF) 180 displays images and the like represented by the display image data created by the camera controller 140. The EVF 180 can selectively display a video image and a still image. Furthermore, there are cases where the EVF 180 and the camera monitor 120 displaying the same content, and cases where the EVF 180 and the camera monitor 120 display different contents. These are controlled by the camera controller 140. The EVF 180 includes an EVF liquid-crystal monitor 181 for displaying images and the like, an EVF optical system 182 for enlarging the display on the EVF liquid-crystal monitor 181, and an eyepiece window 183 to which a user moves his/her eye close.

It should be noted that the EVF 180 is also one example of the display section, and is different from the camera monitor 120 in that the user moves his/her eye close to the EVF 180 for viewing. A structure difference of those is that the EVF 180 has the eyepiece window 183 whereas the camera monitor 120 does not have the eyepiece window 183.

It should be noted that, display luminance can be ensured for the EVF liquid-crystal monitor 181, by having a backlight (not shown) when a transmissive liquid crystal is used and by having a frontlight (not shown) when a reflective liquid crystal is used. The EVF liquid-crystal monitor 181 is one example of an EVF monitor. As the EVF monitor, an organic EL, an inorganic EL, a plasma display panel, and the like capable of displaying images can be used. When a self-light-emitting device such as the organic EL is used, an illumination light source is not necessary.

<<Operation Section>>

The operation section 130 receives operations by the user. Specifically, as shown in FIG. 1 and FIG. 2, the operation section 130 includes the release button 131 for receiving a shutter operation by the user, and a power switch 132 which is a rotating type dial switch disposed on the upper surface of the camera body 100. At a first rotation position of the power switch 132, the supply of power is turned OFF, and at a second rotation position of the power switch 132, the supply of power is turned ON. The operation section 130 may be in any form as long as it can receive operations by the user, including buttons, levers, dials, touch panels, and the like.

<<Camera Controller>>

The camera controller 140 is a device that forms the core of the camera body 100, and controls the camera body 100. For example, the camera controller 140 controls the shutter unit 190 such that the shutter unit 190 maintains an open state when the supply of power from the power supply 165 is stopped. Furthermore, the camera controller 140 receives instructions from the operation section 130. The camera controller 140 transmits, to a lens controller 240, signals for controlling the lens unit 200 via the body mount 150 and a lens mount 250; and indirectly controls various parts of the lens unit 200. Thus, the camera controller 140 controls the whole digital camera 1.

Furthermore, the camera controller 140 receives various signals from the lens controller 240 via the body mount 150 and the lens mount 250. The camera controller 140 uses a DRAM 141 as a working memory when performing control actions or image-processing actions. It should be noted that the camera controller 140 is one example of a body control section (or body microcomputer). The camera controller 140 is disposed on the main circuit board 142.

<<Card Slot and Memory Card>>

The memory card 171 can be inserted in the card slot 170. The card slot 170 controls the memory card 171 based on a control signal transmitted from the camera controller 140. Specifically, the card slot 170 stores still image data on the memory card 171; and the card slot 170 causes the memory card 171 to output still image data. In addition, the card slot 170 stores video data on the memory card 171; and the card slot 170 causes the memory card 171 to output video data.

The memory card 171 can store image data generated through image processing by the camera controller 140. For example, the memory card 171 can store uncompressed RAW image files and compressed JPEG image files. Furthermore, the memory card 171 can output, via the card slot 170, image data or image files, which have been pre-stored in the memory card 171. Image data or image files outputted from the memory card 171 are image-processed by the camera controller 140. For example, the camera controller 140 conducts a decompression process on image data or an image file acquired from the memory card 171 to generate display image data.

The memory card 171 can store video data generated through image processing by the camera controller 140. For example, the memory card 171 can store video files compressed in accordance with H.264/AVC which is a video compression standard. Furthermore, the memory card 171 can output, via the card slot 170, video data and video files, which have been stored in memory card 171 in advance. Video data or video files outputted from the memory card 171 are image-processed by the camera controller 140. For example, the camera controller 140 conducts a decompression process on video data or a video file acquired from the memory card 171, and generates display video data.

It should be noted that the memory card 171 is one example of a storage section. The storage section may be one that can be inserted in to the camera body 100 such as the memory card 171, or may be fixed in the digital camera 1.

<<Power Supply>>

The power supply 165 supplies power to various parts so as to be used in the digital camera 1. The power supply 165 may be, for example, a dry battery, or a rechargeable battery. Furthermore, the power supply 165 may be a unit that receives external power via a power cord or the like and supplies the power to the digital camera 1.

<<Body Mount>>

The body mount 150, to which the lens unit 200 is mountable, includes a body mount ring 151 and an electrical contact 153. The body mount 150 can electrically and mechanically connect with the lens mount 250 of the lens unit 200.

The body mount ring 151 is a ring shape member disposed on the exterior front-surface part 101b of the exterior part 101, and mechanically supports the lens unit 200 when being fitted to a lens mount ring 251 disposed on the lens unit 200. The lens mount ring 251 is fitted to the body mount ring 151 through a so-called bayonet mechanism. Specifically, depending on the rotation-positional relationship with the body mount ring 151 around the optical axis, the lens mount ring 251 can assume a first state of not being fitted to the body mount ring 151, and a second state of being fitted to the body mount ring 151.

More specifically, the lens mount ring 251 can assume the first state in which the lens mount ring 251 is movable with regard to the body mount ring 151 in the optical axis direction. In the first state, the lens mount ring 251 can be inserted in the body mount ring 151. When the lens mount ring 251 is rotated with regard to the body mount ring 151 in a state of being inserted in the body mount ring 151, the lens mount ring 251 fits to the body mount ring 151. The rotation-positional relationship between the body mount ring 151 and the lens mount ring 251 at that moment is the second state.

Since strength is required for the body mount ring 151 in order to support the lens mount ring 251, the body mount ring 151 is preferably formed from metal. In the present embodiment, the body mount ring 151 is formed from metal.

In a state where the lens unit 200 is mounted on the camera body 100, the electrical contact 153 is in contact with an electrical contact 253 included in the lens mount 250. In this manner, the body mount 150 and the lens mount 250 can be electrically connected via the electrical contact 153 of the body mount 150 and the electrical contact 253 of the lens mount 250. As a result, in the digital camera 1, at least either one of data and control signal can be transmitted and received between the camera body 100 and the lens unit 200 via the body mount 150 and the lens mount 250. Specifically, the body mount 150 and the lens mount 250 enable at least either one of data and control signal to be transmitted and received between the camera controller 140 and the lens controller 240 included in the lens unit 200. Furthermore, the body mount 150 supplies power, which is received from the power supply 165, to the whole lens unit 200 via the lens mount 250.

The body mount 150 is supported by the mainframe 154 via a body mount support part 152. More specifically, the body mount support part 152 is connected to the body mount ring 151, and supports the body mount ring 151.

The body mount support part 152 is supported by the mainframe 154, and is disposed between the body mount ring 151 and the shutter unit 190.

<<Shutter Unit>>

The shutter unit 190 is a so-called focal-plane shutter, and allows blocking of light directed to the CMOS image sensor 110. The shutter unit 190 is disposed between the body mount 150 and the CMOS image sensor 110. The shutter unit 190 includes a rear curtain, a front curtain, and a shutter support frame. The shutter support frame is provided with an aperture through which light from a photographic subject passes to be guided to the CMOS image sensor 110. The shutter unit 190 adjusts the exposure time of the CMOS image sensor 110 by placing/removing the rear curtain and the front curtain to/from the aperture of the shutter support frame. The shutter unit 190 can be mechanically held in an open state. Holding mechanically is a concept of holding one at an open state without using a force of electricity, and includes, for example, engaging of two objects or holding with permanent magnets.

<<Optical Low Pass Filter and Vibration Plate>>

The optical low pass filter 114 removes high frequency components in the light from a photographic subject. Specifically, the optical low pass filter 114 performs a separates a photographic-subject image formed by the lens unit 200 so as to have a coarser resolution than the pitch of pixels in the CMOS image sensor 110. Generally, in an imaging element such as the CMOS image sensor 110 or the like, color filters for RGB colors or complementary color filters for YCM colors are arranged in each pixel in a so-called Bayer pattern. As a result, if resolving is conducted on a single pixel, not only is false color generated but also an unpleasant moiré phenomenon occurs for a photographic subject having a repeat pattern. The optical low pass filter 114 is also provided with an Ir cut-off filter function for cutting infrared light.

The vibration plate 115, which is disposed in front of the CMOS image sensor 110 and is supported by a vibration plate support part 116, prevents dust from attaching to the CMOS image sensor 110. Furthermore, through vibration, the vibration plate 115 shakes off dust that has attached to itself. Specifically, the vibration plate 115 includes a transparent thin plate-like member, a piezoelectric element, and a fixing member that fixes the plate-like member through a piezoelectric element. Then, when an alternating voltage is applied thereon and the piezoelectric element vibrates, the plate-like member vibrates. The vibration plate support part 116 supports the vibration plate 115 so as to be disposed at a predetermined position with regard to the CMOS image sensor 110. The vibration plate support part 116 is supported by the mainframe 154 via the body mount 150 and the shutter unit 190.

<<Heat Dissipation Member>>

The heat dissipation member includes the heat dissipation plate 195 and a heat conduction part 196. The heat dissipation plate 195 is disposed between the CMOS image sensor 110 and the main circuit board 142. Specifically, the heat dissipation plate 195 is disposed between the CMOS circuit board 113 and the main circuit board 142. The heat dissipation plate 195 is a rectangular plate-like member for dissipating heat generated by the CMOS image sensor 110. A preferable heat dissipation effect can be obtained when, for example, metals such as aluminum and copper are used as the material of the heat dissipation plate 195.

Connected to the heat dissipation plate 195 is the heat conduction part 196 for transferring heat to the vibration plate support part 116. The heat conduction part 196 is connected and fixed to the vibration plate support part 116. Heat generated from the CMOS image sensor 110 is transferred to the vibration plate support part 116 via the heat dissipation plate 195 and the heat conduction part 196. In order to enable such heat transfer, the heat dissipation plate 195 is disposed on the rear surface of the CMOS image sensor 110, and the heat conduction part 196 extends from the heat dissipation plate 195 to the vibration plate support part 116.

More specifically, the heat conduction part 196 includes four sheets of plates, and the plates extend in the forward direction from the edges at the top, bottom, right, and left of the heat dissipation plate 195. In other words, the heat conduction part 196 is arranged so as to enclose the top, bottom, right, and left of the CMOS image sensor 110. Thus, the CMOS image sensor 110 is enclosed on its top side, right side, left side, bottom side, front side, and rear side by the heat dissipation plate 195 and the heat conduction part 196.

It should be noted that the heat conduction part 196 does not necessarily have to be connected to the vibration plate support part 116, as long as the heat conduction part 196 is connected to any of the components disposed between the mainframe 154 and the CMOS image sensor 110. For example, it is conceivable to have the heat conduction part 196 connected to the body mount support part 152 or the shutter unit 190.

It should be noted that the heat conduction part 196 does not necessarily have to be connected to the vibration plate support part 116 at four positions, as long as at least one sheet among the four sheets of plates is connecting the heat dissipation plate 195 to the vibration plate support part 116, for example. However, when considering the stability of the heat dissipation plate 195, the connection to the heat dissipation plate 195 is preferably formed at not less than three positions.

<1-3: Configuration of Lens Unit>

The lens unit 200 is mountable to the camera body 100, and forms an optical image of the photographic subject. The lens unit 200 mainly includes an optical system L, a drive section 215, the lens controller 240, the lens mount 250, a diaphragm unit 260, and a lens cylinder 290.

The optical system L includes a zoom lens group 210 for changing a focal length of the optical system L, an OIS (Optical Image Stabilizer) lens group 220 for suppressing movement of a photographic-subject image formed by the optical system L with regard to the CMOS image sensor 110, and a focus lens group 230 for changing a focal state of the photographic-subject image formed on the CMOS image sensor 110 by the optical system L.

The diaphragm unit 260 is a light-volume adjusting member for adjusting the amount of light that passes through the optical system L. Specifically, the diaphragm unit 260 includes diaphragm blades (not shown) capable of blocking a part of the beam of light that passes through the optical system L, and a diaphragm drive section (not shown) for driving the diaphragm blades.

The drive section 215 drives each of the lens groups (the zoom lens group 210, the OIS lens group 220, the focus lens group 230) of the optical system L based on a control signal from the lens controller 240. In addition, the drive section 215 includes a detection section for detecting positions of each of the lens groups of the optical system L.

The lens mount 250 includes the lens mount ring 251 and the electrical contact 253, and is mechanically and electrically connected to the body mount 150, as described above.

The lens controller 240 controls the whole lens unit 200 based on a control signal transmitted from the camera controller 140. The lens controller 240 receives position information of each of the lens groups of the optical system L detected by the detection section included in the drive section 215, and transmits the position information to the camera controller 140. The camera controller 140 generates control signals for controlling the drive section 215 based on the received position information, and transmits the control signals to the lens controller 240. The lens controller 240 transfers the control signals generated by the camera controller 140 to the drive section 215. The drive section 215 adjusts the positions of the zoom lens group 210, the OIS lens group 220, and the focus lens group 230 based on the control signals.

On the other hand, the camera controller 140 generates control signals for operating the diaphragm unit 260 based on information representing such as the amount of light received by the CMOS image sensor 110, whether a video or a still image is to be taken, and whether an operation has been performed to set priority to an aperture value. Here, the lens controller 240 relays the control signals generated by the camera controller 140 to the diaphragm unit 260.

In addition, the lens controller 240 uses a DRAM 241 as a working memory when driving the diaphragm unit 260 and each of the lens groups of the optical system L. Furthermore, flash memory 242 stores therein parameters and programs used by the lens controller 240.

The lens cylinder 290 mainly houses therein the optical system L, the lens controller 240, the lens mount 250, and the diaphragm unit 260. In addition, a zoom ring 213, a focal ring 234, and an OIS switch 224 are disposed on the outside of the lens cylinder 290.

The zoom ring 213 is a cylindrical member and is rotatable on the outer circumferential surface of the lens cylinder 290. The zoom ring 213 is one example of a manipulation part for manipulating focal length. When the zoom ring 213 is rotated, the focal length of the optical system L is determined in accordance with the position of the zoom ring 213 after the rotation. The position of the zoom ring 213 is detected, for example, by the detection section included in the drive section 215.

The focal ring 234 is a cylindrical member and is rotatable on the outer circumferential surface of the lens cylinder 290. The focal ring 234 is one example of a manipulation part for manipulating a focal state of a photographic-subject image formed on the CMOS image sensor 110 by the optical system L. When the focal ring 234 is rotated, the focal state of the photographic-subject image is adjusted in accordance with the position of the focal ring 234 after the rotation. For example, the lens controller 240 generates a control signal based on position information of the focal ring 234, and outputs the control signal to the drive section 215. The drive section 215 drives the focus lens group 230 based on the control signal.

The OIS switch 224 is one example of a manipulation part for manipulating an OIS. When the OIS switch 224 is turned OFF, the OIS does not operate. When the OIS switch 224 is turned ON, the OIS can be operated.

<1-4: Structural Characteristics>

The camera body 100 does not have a mirror box apparatus, and is different from a single-lens reflex camera in this regard. In the following, structural characteristics of the camera body 100 will be described in further detail by using FIG. 6A and FIG. 6B.

Figure 6A:
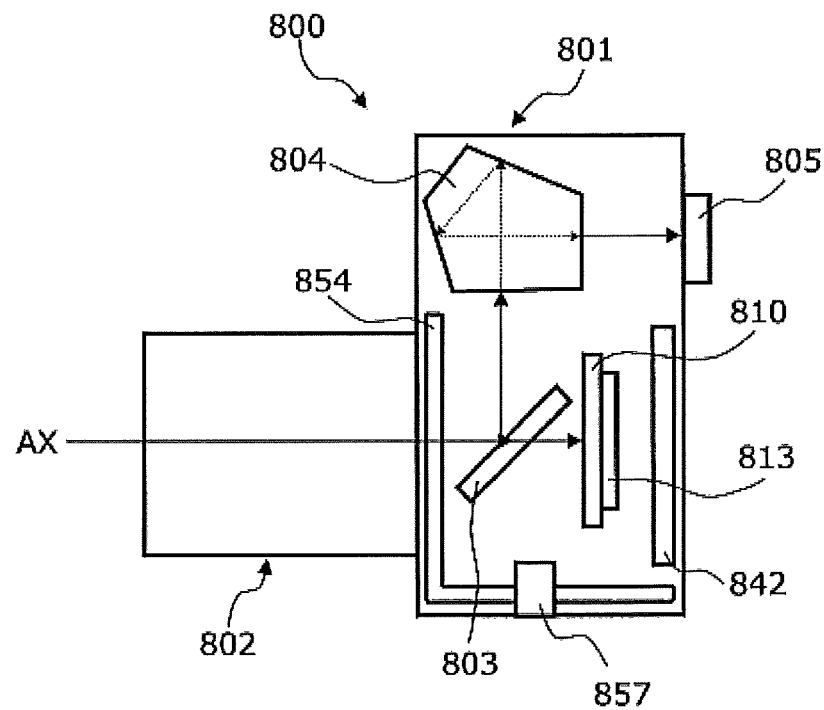
FIG. 6A is an outline cross sectional view of a single-lens reflex camera 800.
Figure 6B:
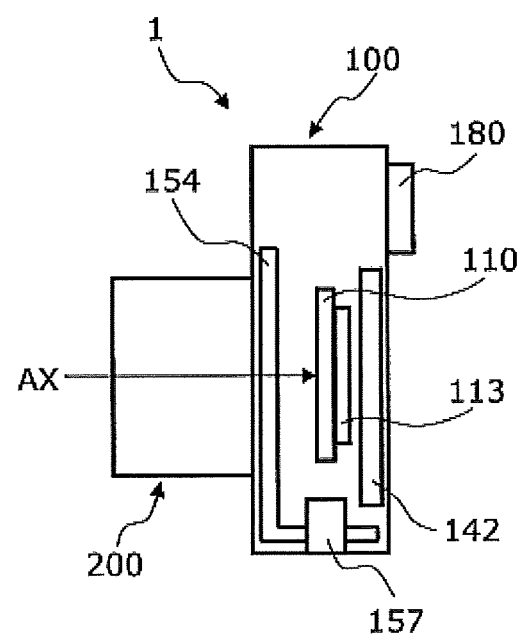
FIG. 6B is an outline cross sectional view of the digital camera 1.

FIG. 6A is an outline cross sectional view of a single-lens reflex camera 800. FIG. 6B is an outline cross sectional view of the digital camera 1 of the present embodiment. It should be noted that, in FIG. 6B, members such as the body mount 150, the shutter unit 190, the vibration plate 115, the vibration plate support part 116, the heat dissipation plate 195, and the heat conduction part 196 are omitted. Furthermore, in FIG. 6B, details of the structure around the support attaching part 157 is also omitted.

In the single-lens reflex camera 800 shown in FIG. 6A, a mirror box apparatus is disposed on the front surface of a CMOS image sensor 810, i.e., on a side of a lens unit 802 of the CMOS image sensor 810. The mirror box apparatus includes a reflective mirror 803 and a pentaprism 804. In addition, on the rear surface of the CMOS image sensor 810 (i.e., the opposite side of the lens unit 802 with regard to the CMOS image sensor 810), a CMOS circuit board 813 and a main circuit board 842 including a camera controller 840 are disposed in order from the front. Furthermore, in order to ensure the strength of a camera body 801, a mainframe 854 formed from metal is arranged from the front surface to the bottom surface of the inside of the camera body 801. Furthermore, a support attaching part 857 is disposed on the bottom surface of the camera body 801, and the support attaching part 857 is fixed to the mainframe 854.

In the single-lens reflex camera 800, a photographic subject optical image, which is formed by the lens unit 802 with the reflective mirror 803 and the pentaprism 804 included in the mirror box apparatus, is guided to the CMOS image sensor 810 or an optical finder 805. In this manner, since it is necessary to secure space for disposing the movable reflective mirror 803 and pentaprism 804, and space for the optical path from the reflective mirror 803 to the optical finder 805 inside the camera body 801; the camera body 801 is not suitable for size reduction. On the other hand, in the single-lens reflex camera 800, heat generated by the CMOS image sensor 810 is easily dissipated, due to having a large space inside the camera body 801, having a large surface area on the camera body 801, and the like. In addition, since the support attaching part 857 can be disposed at a position distant from the CMOS image sensor 810, it is relatively difficult for the heat generated by the CMOS image sensor 810 to be transferred to the support attaching part 857.

In contrast to this with the digital camera 1 according to the present embodiment, the size of the camera body 100 can be reduced since the flange focus can be shortened due to not having a mirror box apparatus in the front side of the CMOS image sensor 110, as shown in FIG. 6B. Furthermore, since the flange focus is short, the degree of freedom for designing the optical system L increases, and thereby the size of the lens unit 200 can be reduced. Thus, omitting the mirror box apparatus enables reduction of the size of the digital camera 1.

On the other hand, although size reduction of the camera body 100 can be sought due to not needing space for having the mirror box apparatus as with the single-lens reflex camera 800, the distance between the CMOS image sensor 110 and the support attaching part 157 is smaller when compared to that in the single-lens reflex camera 800 since the components are densely arranged in the digital camera 1. Furthermore, power consumption of the camera controller 140 and the CMOS image sensor 110 becomes large in order to obtain high definition images and/or enable video-shooting, and thereby the amount of heat generated by the CMOS image sensor 110 and the camera controller 140 becomes large.

For example, since the CMOS image sensor 110 adopted in the digital camera 1 is capable of shooting video images at high resolution, power consumption of the CMOS image sensor 110 is approximately three times (0.4 W to 1.2 W) of that in a CMOS image sensor (for example, the CMOS image sensor 810 in the single-lens reflex camera 800) that is not capable of shooting video images at high resolution. As a result, the amount of heat generated by the CMOS image sensor 110 is larger than the amount of heat generated in the CMOS image sensor that is not capable of shooting video images at high resolution.

As described above, in the digital camera 1, when compared to the single-lens reflex camera 800, the amount of heat generated by electronic components such as the CMOS image sensor 110, the camera controller 140, and the like is large, while the support attaching part 157 is arranged in the vicinity of the CMOS image sensor 110 associated with size reduction. Therefore, heat generated at the CMOS image sensor 110 is easily transferred to the support attaching part 157. As a result, a user may experience a sense of discomfort by feeling a difference in the temperature of the periphery and the temperature of the support attaching part 157 when touching the support attaching part 157.

<<Support Attaching Part>>

Figure 8:
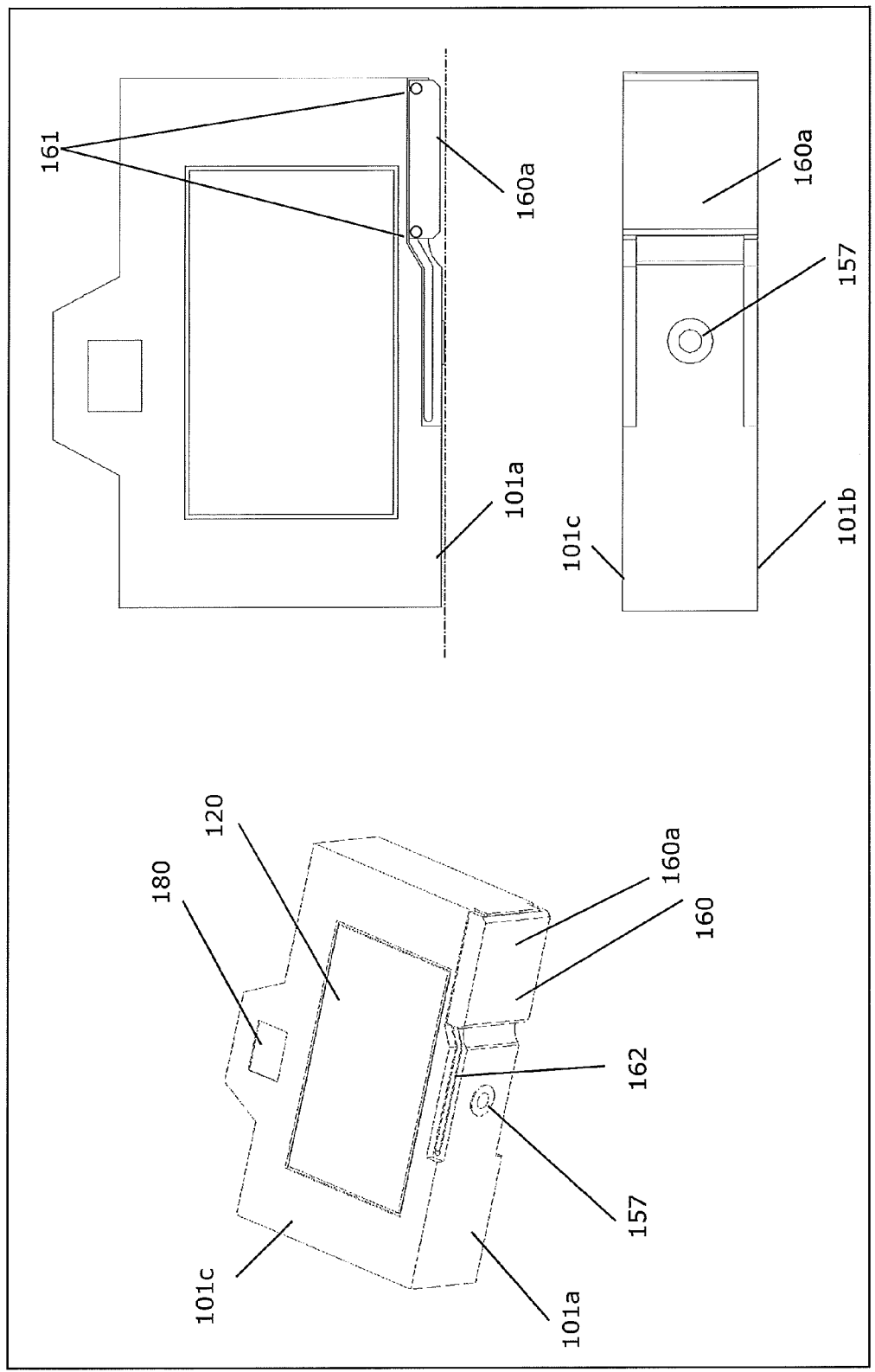
FIG. 8 is a perspective diagram of the camera body 100 when being mounted on the support.
Figure 9:
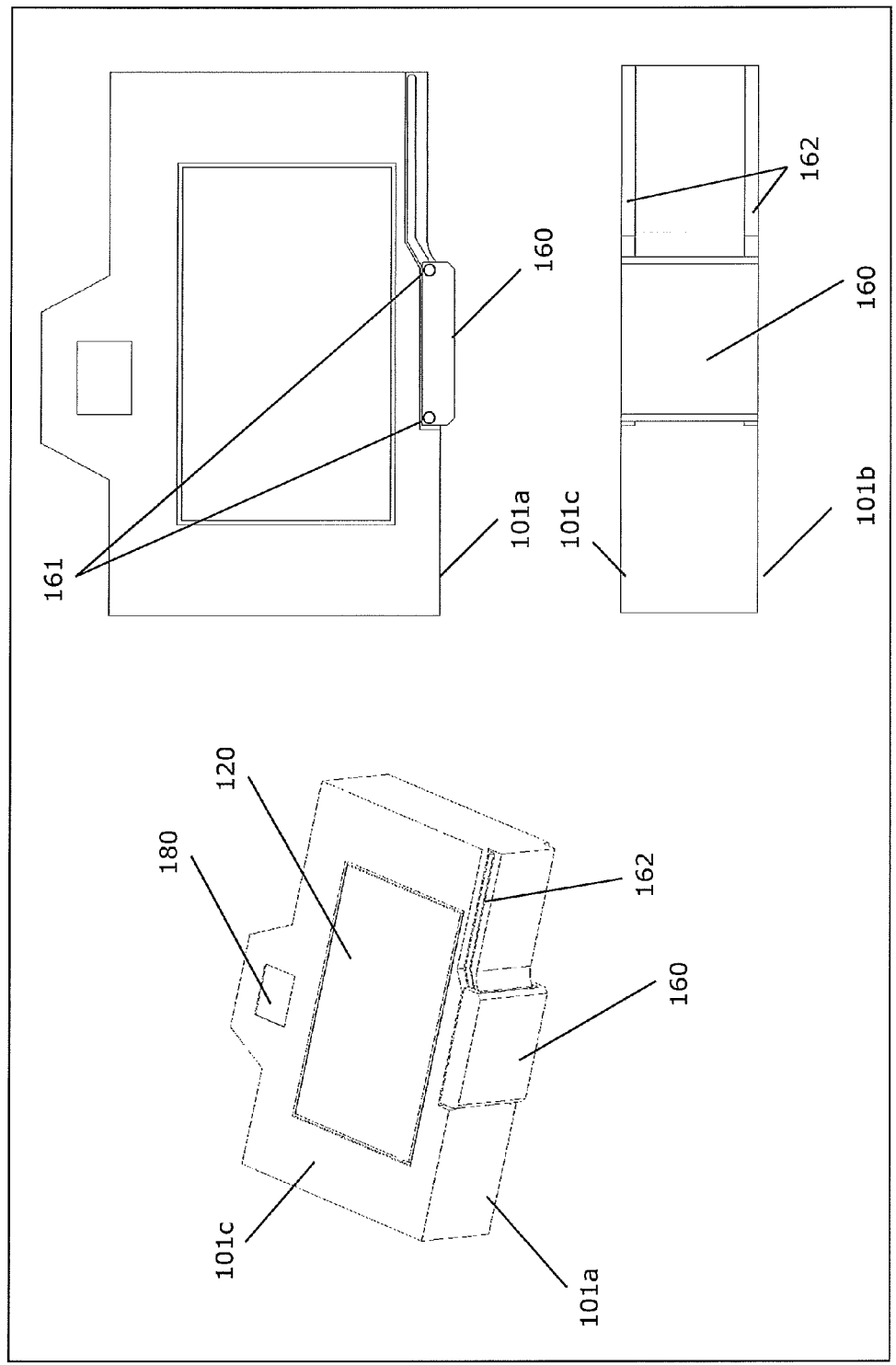
FIG. 9 is a perspective diagram of the camera body 100 when not being mounted on a support.

As shown in FIG. 4, FIG. 8, and FIG. 9, the support attaching part 157 is disposed on the exterior bottom-surface part 101a. The support attaching part 157 is provided with a thread part 157a, and a support 90 such as a tripod, a monopod, or the like is attachable in accordance with needs. FIG. 7 shows a state in which the camera body 100 is mounted on the support 90. Here, the support 90 is a fixing instrument that is attached to the imaging device in order to stabilize the attitude of the imaging device when taking an image. Conceivable examples of the support 90 include tripods, monopods, and the like.

Furthermore, on the exterior bottom-surface part 101a, a surface on which the support attaching part 157 is disposed is referred to as a support attaching surface. In addition, a screw hole to which a tip of the support 90 can be fitted is provided on the thread part 157a. An exposed surface is formed on the periphery of the inlet of the screw hole on the support attaching part 157. When the support 90 is attached to the support attaching part 157, the exposed surface and the support 90 make contact with each other and the exposed surface is hidden by the support 90. Therefore, when the support 90 is attached to the support attaching part 157, the user is prevented from a directly touching the support attaching part 157; and thereby the user can avoid feeling a difference in temperature between the temperature of the support attaching part 157 and the temperature of the periphery by touching the support attaching part 157.

The mainframe 154 is arranged inside the exterior part 101 of the camera body 100. The mainframe 154 is arranged inside the camera body 100 along the exterior front-surface part 101b and the exterior bottom-surface part 101a. The mainframe 154 is connected to the body mount support part 152. Therefore, the mainframe 154 supports the lens unit 200 via the body mount 150 and the body mount support part 152. Thus, it is necessary for the mainframe 154 to have a certain degree of strength. Hence, the mainframe 154 is preferably formed from metal. Conceivable materials of the mainframe 154 include, for example, aluminum and stainless alloy. Furthermore, the support attaching part 157 is connected to the mainframe 154 inside the camera body 100, and heat generated by electronic components such as the imaging element, the camera controller, and the like is transferred to the mainframe 154 and the support attaching part 157. As a result, the temperature of the support attaching part 157 increases.

A support attaching part cover 160 moves between a position (first position) covering the support attaching part 157, and a position (second position) that uncovers the support attaching part 157 without generating convexness with regard to the exterior bottom-surface part 101a. Specifically, the support attaching part cover 160 moves between the first position and the second position by a cam groove pin 161 disposed on the support attaching part cover 160 and a cam groove 162 provided on the exterior part 101. When it is necessary to attach the support 90 such as a tripod or the like, the support attaching part cover 160 is moved to the second position (cf., FIG. 8). By moving the support attaching part cover 160 to a position that does not generate convexness with regard to the exterior bottom-surface part 101a, attachment of the support 90 such as a tripod, a monopod, or the like is possible in a stable manner since a large area can be ensured on the support attaching surface. Furthermore, when it is not necessary to attach the support 90 such as a tripod or the like, the support attaching part cover 160 moves to the first position (cf., FIG. 9). As a result, the support attaching part cover 160 covers the support attaching part 157, and thereby the user will not touch the support attaching part 157 and will not experience a sense of discomfort. The support attaching part cover 160 may also be referred as a tripod cover or a monopod cover.

As shown in FIG. 4, the support attaching part 157 is disposed on the bottom side of the CMOS image sensor 110 and is aligned to the CMOS image sensor 110 in the Z-axis direction of the support attaching part 157. By disposing the support attaching part 157 in this manner, weight distribution is unlikely to deviate from the support attaching part 157 acting as a center, even when a component (e.g., the lens unit 200) having a relatively large weight is disposed in the periphery of the CMOS image sensor 110. As a result, the digital camera 1 can be easily stabilized when the support 90 is attached thereto.

<1-5: Advantageous Effects>

The advantageous effects of the camera body 100 according to the present embodiment includes the following.

(1)

With the camera body 100, a user can avoid feeling a difference in temperature in the temperature of the support attaching part 157 and the temperature of the periphery by touching the support attaching part 157, since the support attaching part cover 160 can cover the support attaching part 157 when the support 90 is not attached to the support attaching part 157. Thus, a structure capable of preventing the user from touching the support attaching part 157 when the support 90 is not used can be provided.

(2)

With the camera body 100, damage to the support attaching part 157 due to external factors can be prevented, since the support attaching part cover 160 can cover the support attaching part 157 when the support 90 is not attached to the support attaching part 157.

(3)

When the camera body 100 is used by having the support 90 attached to the support attaching part 157, the support 90 such as a tripod, a monopod, or the like can be stably attached, since a large area can be ensured on the support attaching surface by having the support attaching part cover 160 move to a position that does not generate convexness with regard to the support attaching surface.

Other Embodiments

Embodiments of the present invention is not limited to the embodiments described above, and numerous other variations, transformations, modifications, deformations, and adjustments can be devised without departing from the scope of the invention. Although an interchangeable lens type digital camera is used as an example in the embodiments described above, an imaging device to which the technology described here can be applied is not limited thereto. The technology disclosed herein is applicable to imaging devices having a support attaching part, and is applicable to, for example, interchangeable lens type digital camcorders, lens tube fixed type digital cameras, and video cameras.

INDUSTRIAL APPLICABILITY

The technology shown here provides a structure and the like that prevents a user from touching a support attaching part when a support is not used, and can be applied to, imaging devices or the like attachable to a support. Specifically, the technology disclosed herein is applicable to digital still cameras, digital camcorders, and the like.

DESCRIPTION OF THE REFERENCE CHARACTERS 1 digital camera (one example of an imaging device)
90 support (tripod)
100 camera body (one example of an imaging device)
101 exterior part
101a exterior bottom-surface part
101b exterior front-surface part
101c exterior rear-surface part
110 CMOS image sensor
111 AD converter
112 timing generator
113 CMOS circuit board
114 optical low pass filter
115 vibration plate
116 vibration plate support part
120 camera monitor
121 hinge
130 operation section
131 release button
132 power switch
140 camera controller
141 DRAM
142 main circuit board
150 body mount
151 body mount ring
152 body mount support part
153 electrical contact
154 mainframe
157 support attaching part
157a thread part
160 support attaching part cover (tripod cover)
160a support attaching part cover external surface
161 cam groove pin
162 cam groove
165 power supply
170 card slot
171 memory card
180 electronic view finder (EVF)
181 EVF liquid-crystal monitor 182 EVF optical system
183 eyepiece window
190 shutter unit
195 heat dissipation plate
196 heat conduction part
200 lens unit
210 zoom lens
211 drive mechanism
213 zoom ring
220 OIS lens
224 OIS switch
230 focus lens
234 focal ring
240 lens controller
241 DRAM
242 flash memory
250 lens mount
251 lens mount ring
253 electrical contact (main body side)
260 diaphragm unit
290 lens cylinder
800 single-lens reflex camera
801 camera body
802 lens unit
803 reflective mirror
804 pentaprism
805 optical finder
810 CMOS image sensor
813 CMOS circuit board
842 main circuit board
854 mainframe
857 support attaching part

The invention claimed is:

1. An imaging device to which a support is attachable, the imaging device comprising:
   a device body, the body having a stepped support-attaching surface defining a first position, and a second position recessed relative to the first position;
   a support attaching part provided in the first position on the support attaching surface and including a screw hole; and
   a support-attaching part cover arranged on the support-attaching surface and therein configured to move between the first position, wherein the support-attaching part cover covers the support attaching part, and the recessed second position, wherein the support-attaching part cover exposes the support attaching part and is withdrawn so as not to protrude with respect to the support-attaching surface.

2. The imaging device according to claim 1, wherein:
   when the support is attached to the support attaching part, the support attaching part cover moves from the first position to the second position; and
   when the support is removed from the support attaching part, the support attaching part cover moves from the second position to the first position.

3. The imaging device according to claim 1, wherein:
   the support attaching part has an exposed surface formed on a periphery of an inlet of the screw hole; and
   when the support is attached to the support attaching part, the exposed surface and the support make contact with each other.

4. The imaging device according to claim 1, wherein the support attaching surface is provided on an exterior bottom-surface part of the imaging device.

5. The imaging device according to claim 1, wherein the support attaching part cover is operable to move between the first position and the second position by a cam groove pin disposed on the support attaching part cover and a cam groove provided on the support attaching surface.

* * * * *